Patented May 23, 1950

2,509,160

UNITED STATES PATENT OFFICE 2,509,160

MAKING HEXACHLOROCYCLOPENTADIENE

Earl T. McBee and Charles F. Baranauckas, West Lafayette, Ind., assignors to Purdue Research Foundation, West Lafayette, Ind., a corporation of Indiana No Drawing. Application December 22, 1945, Serial No. 637,070

16 Claims. (Cl. 260—648)

This invention relates to a method of treating hydrocarbons containing at least five carbon atoms and partially chlorinated derivatives thereof, to produce hexachlorocyclopentadiene.

It is desirable to have a method for the production of hexachlorocyclopentadiene wherein the starting material used is readily available, the procedure is simple and the desired compound is obtained in a high yield. From the standpoint of cost, the most desirable starting material would be a compound having at least five carbon atoms and available from a by-product of the oil industry. However, the obtaining of an alicyclic chlorocarbon from such a material, n-pentane, for example, was not to be expected because it involves accomplishing the substitution of hydrogen by chlorine, cyclization, and the formation of a conjugated double bond system. If isopentane is the starting material, the problem is further complicated because it involves accomplishing the reverse of the usual rearrangement of a terminal methyl group as well as substitution, cyclization, and conjugation. If chlorinated derivatives of n-pentane are used, the problem of cyclization and conjugation still exists. The reaction is even more complex if such a starting material as neohexane, having four methyl groups, be used, because it requires the rearrangement of one methyl group to lengthen the carbon-carbon chain, the splitting off of another methyl group, the subsequent joining of the terminal carbon atoms, and the formation of conjugated double bonds. When unsaturated hydrocarbons or their partially chlorinated derivatives are employed as the starting material, the problem of cyclization and rearrangement still exists, and the formation of a conjugated double bond system may remain.

It is an object of this invention to provide a method for the production of hexachlorocyclopentadiene in high yield by a direct and simple procedure. It is a further object to provide a method for the production of hexachlorocyclopentadiene from inexpensive starting materials.

We have now found that we are able to accomplish the objects above-stated and are able to obtain hexachlorocyclopentadiene, usually in high yield, by reacting with chlorine a compound selected from the group consisting of aliphatic hydrocarbons containing at least five carbon atoms and alicyclic hydrocarbons containing five carbon atoms in the ring, or partially chlorinated derivatives thereof, under suitable conditions to produce higher polychlorinated derivatives of the compounds mentioned. The invention is particularly applicable to five carbon atom alicyclic hydrocarbons having the five carbon atoms in the ring, and five carbon atom aliphatic hydrocarbons wherein the number of carbon atoms in the longest straight chain is four or five. These chlorinated compounds are then subjected to a thermal treatment whereby hexachlorocyclopentadiene is produced. When the starting material is a hydrocarbon or a lower partially chlorinated hydrocarbon, the above-mentioned thermal treatment is accomplished with the use of chlorine. When, however, the starting material is a highly chlorinated hydrocarbon or chlorocarbon the thermal treatment may be accomplished without added chlorine. When no added chlorine is used in the above-mentioned thermal reaction, the starting material preferably has at least enough of the hydrogen substituted with chlorine to provide sufficient chlorine to convert all of the hyrogen split off to hydrogen chloride.

We have found, to our surprise, that polychloro-n-pentanes, for example, when subjected to certain temperature conditions, preferably in the presence of added chlorine, react with a splitting off of some of the chlorine atoms and/or replacement of the hydrogen by chlorine, the joining of the terminal carbon atoms, and the formation of conjugated double bonds. When necessary for the formation of the desired compound, as when polychloro compounds of isopentane are used as the starting material, we can cause the rearrangement of the carbon atoms in the starting material. In the case of polychloro compounds of neohexane the reaction is even more surprising because we can cause a controlled carbon-carbon cleavage with a loss of one carbon atom and the rearrangement of another, resulting in the formation of the desired hexachlorocyclopentadiene.

In instances where starting materials such as cyclopentane, cyclopentene, and cyclopentadiene or partially chlorinated derivatives thereof are used, hydrogen atoms are caused to split off and/or be replaced, and conjugated double bonds formed if not already present, yet, under the conditions of the reaction a ring structure still persists so that hexachlorocyclopentadiene is obtained.

While we preferably use as starting material higher polychlorinated compounds, we may employ hydrocarbons. However, when it is desired to start with hydrocarbon material, it is necessary first either to chlorinate at least partially the said hydrocarbon material as in a photochemical liquid phase procedure or to carry out the high temperature reaction at a higher ratio of chlorine. When hydrocarbons are used and the reaction is carried out directly in a high temperature reactor it is necessary to use a large excess of chlorine to avoid an explosion or burning or to inject the chlorine portionwise to maintain the concentration of chlorine below the explosive range. When hydrocarbons are used and polychloro compounds are prepared as starting materials for the reaction, this can be carried out by introducing the hydrocarbon and gaseous chlorine continuously and simultaneously, and at separate points substantially removed from one another, into a mixture of liquid highly chlorinated hydrocarbon material, maintained at a temperature not substantially exceeding 90 degrees centigrade, preferably while causing liquid polychlorohydrocarbon from the region around the point of introduction of hydrocarbon to flow or move away from such region and into the region around the point of introduction of chlorine. In this way the hydrocarbon which is first introduced into the moving body of polychlorohydrocarbons becomes dispersed therein and the resulting mixture then moves into the region around the chlorine inlet where the hydrocarbon reacts rapidly and smoothly with chlorine.

The liquid phase chlorination is conducted by exposing the body of polychlorohydrocarbon material to the action of light, preferably of light having a wave length from about 2000 to 5000 Å, particularly between about 3000 to about 4000 Å. Catalysts, other than light, are not employed and are preferably excluded from the reaction zone since they tend to promote the formation of color within the body of the liquid and thus to decrease the effectiveness of the light.

Polychlorinated compounds having the desired specific gravity are withdrawn from the body of liquid polychlorohydrocarbon mixture and in this way the volume of the mixture in the chlorination vessel is kept substantially constant. Effluent chlorine-containing gases generated within the high-temperature reaction zone are withdrawn and passed into the chlorination vessel in admixture with the hydrocarbon fed thereto. The liquid polychloro compounds thus formed are withdrawn from the chlorination vessel and are then passed, preferably with a further quantity of chlorine, continuously and simultaneously, into an elongated high-temperature reaction zone wherein the reaction to produce hexachlorocyclopentadiene takes place. The reaction product is continuously withdrawn from the high-temperature reactor and the hexachlorocyclopentadiene is separated therefrom.

It is desirable that the specific gravity of the polychloro compounds used as starting material be between about 1.6 and 1.7. Between about 8.0 and about 5.0 moles of chlorine is preferably used in the process for each mole of polychlorohydrocarbon of the specific gravity above-given. The mole ratio of chlorine to polychlorohydrocarbon is preferably maintained slightly above the theoretical amount necessary to replace all hydrogen. For example, if the starting material is a mixture of polychloro compounds of isopentane averaging $C_5H_6Cl_6$, the preferred ratio is about 7.0 moles of chlorine to one mole of the starting material. If the starting material is a mixture of polychloro compounds of cyclopentane averaging about $C_5H_{3.5}Cl_{6.5}$, the preferred ratio is about 5.0 moles of chlorine per mole of starting material.

We have found that the temperature of the reaction of the polychloro compounds with chlorine in the high-temperature reaction zone is especially critical. The temperature in said zone must be maintained between about 350 degrees and about 550 degrees centigrade, a temperature between about 440 degrees and about 500 degrees centigrade is preferred, and a range between about 460 degrees and about 480 degrees centigrade is particularly desirable. It is apparent that, when conducted according to the manner of the following examples, the reaction is conducted at about atmospheric pressure, as no extraneous pressure is applied in these examples, and any slight pressure generated within the reaction tube due to expansion of gases or resistance to flow exerted by the tube walls is but negligible.

The following examples illustrate our invention but are not to be construed as limiting the same:

Example 1

A quantity of polychloro compounds of n-pentane having a specific gravity of 1.50 was placed in a vertical 1¼ inch diameter Pyrex glass column closed at its lower end and having an overflow tube located about thirty inches from the closed end. About 1150 grams of polychloropentane was required to fill the reactor tube up to the overflow. Means was provided to collect the liquid from the overflow tube and to conduct evolved vapors away from the top of the tube. Pentane was introduced into the body of liquid through a porous alundum thimble located near the bottom of the tube and chlorine was introduced through a sintered glass plate located about three inches directly above the n-pentane inlet. The rate of flow of chlorine and n-pentane was regulated so that 8.9 moles of chlorine was introduced into the reactor for each mole of n-pentane. Four 200-watt clear glass tungsten filament lamps were placed around the lower portion of the reactor column to catalyze the reaction. When the polychloropentane mixture reached the desired specific gravity of 1.63, it was withdrawn from the overflow, the hydrogen chloride stripped therefrom, and the liquid introduced into a high-temperature reaction tube. Upon entering the high-temperature zone, the reactants are volatilized, the reaction zone thus being substantially unobstructed. Chlorine and the polychloropentanes were introduced into the high temperature zone through separate means and the rate of flow of chlorine and polychloropentanes was regulated so that six moles of chlorine was introduced for each mole of polychloropentane mixture. The reactor was maintained at 470 degrees centigrade. Effluent chlorine-containing gases generated within the high-temperature reaction zone may be passed into the chlorination vessel in admixture with the pentane fed thereto or passed into the hydrogen chloride stripper. The reaction product was continuously withdrawn and the hexachlorocyclopentadiene was separated therefrom by distillation. The yield of hexachlorocyclopentadiene in continuous operation was 54.6 per cent.

Example 2

Into the high temperature reactor used in Example 1, chlorine and a mixture of polychloro compounds of cyclopentane having an average composition of $C_5H_{3.5}Cl_{6.5}$ and a gravity of 1.668, were introduced at a ratio of 5.9 moles of chlorine to one mole of the polychloro mixture. The reactor was maintained at a temperature of 460 degrees centigrade. The reaction product continuously withdrawn from the reactor and the hexachlorocyclopentadiene was separated therefrom. The yield of the desired product was 74.5 per cent.

Example 3

Into the high temperature reactor used in Example 1, chlorine and a mixture of polychloro compounds of 2,2-dimethylbutane were introduced at a ratio of 7.6 moles of chlorine to one mole of the polychloro mixture. The polychlorinated material fed into the reactor had an average composition of $C_6H_7Cl_7$ and a specific gravity of 1.736. The reactor was maintained at a temperature of 470 degrees centigrade. The reaction product was continuously withdrawn from the reactor and the hexachlorocyclopentadiene was separated therefrom. The yield of the desired product was 18.8 per cent.

Example 4

Into the high temperature reactor used in Example 1, chlorine and a mixture of polychloro compounds of isopentane were introduced at a ratio of 7.7 moles of chlorine to one mole of the polychloro mixture, having an average composition of $C_5H_6Cl_6$ and a specific gravity of 1.649. The reactor was maintained at a temperature of 470 degrees centigrade. The reaction product was continuously withdrawn from the reactor and the hexachlorocyclopentadiene was separated therefrom. The yield of the desired product was 54.2 per cent.

Example 5

Into the high temperature reactor used in Example 1, chlorine and isopentane were introduced at a ratio of 60 moles of chlorine to one mole of isopentane. The reactor was maintained at a temperature of 460 degrees centigrade. The reaction product was continuously withdrawn from the reactor and the hexachlorocyclopentadiene was separated therefrom. The yield of the desired product was 51.3 per cent.

Other materials which may be employed in carrying out our process include pentene, cyclopentene, methyl cyclopentane, isohexane, and isohexene.

We claim:

1. The method which includes: heating, at about atmospheric pressure, a compound selected from the group consisting of aliphatic hydrocarbons wherein the number of carbon atoms in the hydrocarbon molecule is at least five, and wherein the longest straight chain contains at least four carbon atoms; alicyclic hydrocarbons containing five carbon atoms in the ring; and chlorinated derivatives of the foregoing types of hydrocarbons, with chlorine, in amount at least that theoretically required to produce hexachlorocyclopentadiene, in a substantially unobstructed reaction zone, at a temperature between about 350 and about 550 degrees centigrade, and, separating hexachlorocyclopentadiene from the reaction product.

2. The method which includes: reacting, at about atmospheric pressure, a compound selected from the group consisting of aliphatic hydrocarbons wherein the number of carbon atoms in the hydrocarbon molecule is at least five, and wherein the longest straight chain contains at least four carbon atoms, alicyclic hydrocarbons containing in the molecule five carbon atoms in the ring, and chlorinated derivatives thereof, with chlorine in amount at least that theoretically required to produce hexachlorocyclopentadiene, in a substantially unobstructed reaction zone maintained at a temperature between about 350 and about 550 degrees centigrade; and, separating hexachlorocyclopentadiene from the reaction product.

3. The method which includes: reacting, at about atmospheric pressure, a compound selected from the group consisting of chlorinated aliphatic hydrocarbons wherein the number of carbon atoms in the molecule is at least five, and wherein the longest straight chain contains at least four carbon atoms, with chlorine in amount at least that theoretically required to produce hexachlorocyclopentadiene, in a substantially unobstructed reaction zone maintained at a temperature between about 350 and about 550 degrees centigrade; and, separating hexachlorocyclopentadiene from the reaction product.

4. The method which includes: reacting, at about atmospheric pressure, a compound selected from the group consisting of chlorinated alicyclic hydrocarbons containing five carbon atoms in the ring of the molecule, with chlorine in amount at least that theoretically required to produce hexachlorocyclopentadiene, in a substantially unobstructed reaction zone maintained at a temperature between about 350 and about 550 degrees centigrade; and, separating hexachlorocyclopentadiene from the reaction product.

5. The method which includes: introducing a compound selected from the group consisting of alicyclic hydrocarbons containing five carbon atoms in the ring of the molecule, with chlorine in amount at least that theoretically required to produce hexachlorocyclopentadiene, into a substantially unobstructed reaction zone maintained, at about atmospheric pressure, at a temperature between about 350 and about 550 degrees centigrade; and, separating hexachlorocyclopentadiene from the reaction product.

6. The method which includes: introducing a compound selected from the group consisting of aliphatic hydrocarbons wherein the number of carbon atoms in the molecule is at least five and the longest straight chain contains four or five carbon atoms, with chlorine in amount at least that theoretically required to produce hexachlorocyclopentadiene, into a substantially unobstructed reaction zone maintained, at about atmospheric pressure, at a temperature between about 350 and about 550 degrees centigrade; and, separating hexachlorocyclopentadiene from the reaction product.

7. The method which includes: heating, at about atmospheric pressure, and, in a substantially unobstructed reaction zone, at a temperature between about 350 and about 550 degrees centigrade, a compound selected from the group consisting of chlorinated aliphatic hydrocarbons wherein the number of carbon atoms in the molecule is at least five, and the longest straight chain contains four or five carbon atoms, and wherein sufficient hydrogen of the hydrocarbon material has been replaced with chlorine to supply the chlorine theoretically necessary to convert any remaining hydrogen to hydrogen chloride; and, separating hexachlorocyclopentadiene from the reaction product.

8. The method which includes: continuously introducing a compound selected from the group consisting of chlorinated aliphatic hydrocarbons wherein the number of carbon atoms in the molecule is at least five and the longest straight chain contains four or five carbon atoms and wherein sufficient hydrogen of the hydrocarbon material has been replaced with chlorine to supply the chlorine theoretically necessary to convert any remaining hydrogen to hydrogen chloride, into a substantially unobstructed reaction zone maintained at about atmospheric pressure, and at a temperature between about 400 and about 550 degrees centigrade; continuously exhausting the effluent product from the reaction zone, and, separating hexachlorocyclopentadiene from the reaction product.

9. The method according to claim 4, wherein the chlorinated alicyclic hydrocarbon is chlorinated cyclopentane.

10. The method according to claim 5, wherein the alicyclic hydrocarbon is cyclopentane.

11. The method according to claim 3, wherein the chlorinated aliphatic hydrocarbon is a chlorinated pentane.

12. The method according to claim 3, wherein the chlorinated aliphatic hydrocarbon is a chlorinated n-pentane.

13. The method according to claim 6, wherein the aliphatic hydrocarbon is a pentane.

14. The method according to claim 6, wherein the aliphatic hydrocarbon is n-pentane.

15. The method according to claim 2, wherein the temperature is maintained between about 440 and about 500 degrees centigrade.

16. The method according to claim 2, wherein the temperature is maintained between about 460 and about 480 degrees centigrade.

EARL T. McBEE.
CHARLES F. BARANAUCKAS.

REFERENCES CITED

The following references are of record in the file of this patent:

UNITED STATES PATENTS

| Number | Name | Date |
| --- | --- | --- |
| 2,281,096 | Engs et al. | Apr. 28, 1942 |

FOREIGN PATENTS

| Number | Country | Date |
| --- | --- | --- |
| 468,016 | Great Britain | June 28, 1937 |

OTHER REFERENCES

Straus: "Berichte der deutsche chemische Gesellschaft," vol. 63 pages 1883–4 (1930).

McBee et al.: "Industrial and Engineering Chemistry," vol. 33, pages 181–185 (1941).